US012312038B2

(12) United States Patent
Brashear et al.

(10) Patent No.: US 12,312,038 B2
(45) Date of Patent: May 27, 2025

(54) MOTORCYCLE SADDLEBAG SUBWOOFER

(71) Applicant: Epsilon Electronics, Inc., Montebello, CA (US)

(72) Inventors: Ronnie Brashear, Avon, IN (US); Brandon Meyer, Rosemead, CA (US)

(73) Assignee: Epsilon Electronics, Inc., Montebello, CA (US)

( * ) Notice: Subject to any disclaimer, the term of this patent is extended or adjusted under 35 U.S.C. 154(b) by 148 days.

(21) Appl. No.: 17/879,747

(22) Filed: Aug. 2, 2022

(65) Prior Publication Data

US 2023/0041938 A1    Feb. 9, 2023

Related U.S. Application Data

(60) Provisional application No. 63/228,949, filed on Aug. 3, 2021.

(51) Int. Cl.
| | |
|---|---|
| *H04R 1/34* | (2006.01) |
| *B62J 9/00* | (2020.01) |
| *B62J 45/10* | (2020.01) |
| *H04R 1/02* | (2006.01) |

(52) U.S. Cl.
CPC ............. *B62J 45/10* (2020.02); *B62J 9/00* (2013.01); *H04R 1/023* (2013.01); *H04R 1/345* (2013.01)

(58) Field of Classification Search
CPC .... H04R 2499/13; H04R 1/025; H04R 5/023; H04R 1/02; B60R 11/02; B60R 11/0217
See application file for complete search history.

(56) References Cited

U.S. PATENT DOCUMENTS

| | | | |
|---|---|---|---|
| 8,139,810 B2 * | 3/2012 | Armitage | B60R 11/0217 |
| | | | 381/86 |
| D672,306 S * | 12/2012 | Eder | D12/410 |

* cited by examiner

*Primary Examiner* — Kile O Blair
(74) *Attorney, Agent, or Firm* — Dykema Gossett PLLC (57) ABSTRACT

Various aspects of the present disclosure are directed to a subwoofer housing that may be installed within a motorcycle storage container (also known as a saddlebag). The subwoofer housing may include a subwoofer transducer which when used in conjunction with full range audio transducers within the motorcycle audio system introduces dynamic low frequency harmonics into the overall frequency response. In some embodiments of the present disclosure, the subwoofer housing may include an active subwoofer transducer, and a passive radiator transducer, both with downward orientations. The saddlebag including a floor, and one or more air vents in the floor. Sound waves emitted from the active subwoofer transducer and the passive radiator transducer travel through the one or more air vents and reflect in an omni-directional pattern from a road surface to generate greater audible levels of the low frequency sound waves.

9 Claims, 7 Drawing Sheets

MOTORCYCLE SADDLEBAG SUBWOOFER

CROSS-REFERENCE TO RELATED APPLICATIONS

This application claims the benefit of U.S. provisional application No. 63/228,949, filed 3 Aug. 2021, which is hereby incorporated by reference as though fully set forth herein.

BACKGROUND a. Field

The instant disclosure relates to motorcycle audio systems; more specifically, improving motorcycle audio systems by enhancing audible frequency response of the entire system.

b. Background Art

Original equipment manufacturer audio systems found on motorcycles are often limited to traditional full range audio transducers. Such full range audio transducers are incapable of reproducing lower frequency harmonics due to their smaller diameter and the volume of air movement required to achieve such low harmonic frequencies. However, the addition of larger diameter transducers, such as subwoofer transducers, to motorcycle audio systems are limited by space constraints among other factors.

The foregoing discussion is intended only to illustrate the present field and should not be taken as a disavowal of claim scope.

BRIEF SUMMARY

Various aspects of the present disclosure are directed to a subwoofer housing that may be installed within a motorcycle storage container (also known as a saddlebag). The subwoofer housing includes a subwoofer transducer which when used in conjunction with full range audio transducers within the motorcycle audio system introduces dynamic low frequency harmonics into the overall frequency response (otherwise not present).

In some embodiments of the present disclosure, the subwoofer assembly may include an active subwoofer transducer, a passive radiator transducer, and an audio amplifier. The subwoofer housing being shaped to fit specific contours & clearances of specific saddlebags for installation therein.

In one example embodiment of the present disclosure, a motorcycle saddlebag subwoofer system is disclosed. The motorcycle saddlebag subwoofer system including a motorcycle saddlebag with one or more air vent inserts extending through a base of the saddlebag, and a subwoofer assembly positioned within the saddlebag. The subwoofer assembly including a downward facing subwoofer transducer.

In another embodiment of the present disclosure, an air vent insert is disclosed. The air vent insert including a body, one or more air vents extending through the body, and a waterproof acoustic membrane extending across the one or more air vents.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF EMBODIMENTS

Various aspects of the present disclosure are directed to a subwoofer assembly that may be installed within a saddlebag. The subwoofer assembly includes a subwoofer transducer which when used in conjunction with full range audio transducers within the motorcycle audio system introduces dynamic low frequency harmonics into the overall frequency response (otherwise not present).

In some embodiments of the present disclosure, the subwoofer assembly may include an active subwoofer transducer, passive radiator transducer, among other optional components such as controller circuitry and an audio amplifier. The subwoofer assembly may be shaped to fit specific contours & clearances of specific motorcycle saddlebags.

Aspects of the present disclosure are directed to a subwoofer assembly for installation within a saddlebag storage container mounted on a motorcycle chassis. The subwoofer assembly includes a subwoofer transducer that introduces dynamic low frequency harmonics into the overall frequency response of the motorcycle's audio system. In at least one embodiment, the subwoofer assembly includes a housing that encloses one or more active subwoofer transducers, one or more passive radiator transducers, and optionally an audio amplifier and/or subwoofer controller circuitry. The subwoofer housing may be shaped with specific contours & clearances so that it may fit specific motorcycle saddlebag designs (without requiring significant modification to the saddlebag structure).

To take advantage of boundary loading harmonics, it is preferable for the one or more subwoofer transducers and/or one or more passive radiator transducers to be positioned facing downward within the subwoofer housing. The low frequency sounds waves emanating from the subwoofer housing will travel with a downward trajectory and eventually contact a surface (e.g., a road surface below the motorcycle) and reflect in an omni-directional pattern from the surface. In accordance with boundary loading harmonic principals, the reflected sound waves will generate greater audible levels of the low frequency sound waves for the motorcycle rider than other subwoofer orientations. However, to enable the boundary loading principle in various motorcycle applications, sound waves generated by the subwoofer transducer and/or passive radiator transducer must escape from the saddlebag & reflect from the same ground plane surface as the motorcycle. To facilitate escape of the soundwaves from the saddlebag in a downward direction, the saddlebag may include a number of air vents or apertures in a bottom surface thereof. As such air vents would expose the inside of the saddlebag, and the subwoofer assembly therein, to the external elements, various aspects of the present disclosure utilize a waterproof membrane material over the air vents to prevent water ingress through the air vents into the saddlebag while allowing sounds waves to pass through.

In some embodiments of the present disclosure, a motorcycle saddlebag may be retrofitted for use with a saddlebag subwoofer consistent with the present disclosure. For example, one or more apertures may be drilled in a bottom surface of the saddlebag and air vent inserts installed within the apertures. In some specific embodiments of the present disclosure, the air vent inserts may include snap features to securely couple to the saddlebag. In yet other embodiments, the inserts may be threaded to receive a nut that couples the insert to the saddlebag. A number of other mechanical coupling mechanisms which may be utilized to secure the insert to the saddlebag and would be readily apparent to a skilled artisan.

In one specific embodiment of the present disclosure, air vent inserts include one or more snap features that pressure fit in place within an aperture of the saddlebag. The air vent insert may include a water sealing gasket which extends between the coupling perimeter of the insert and the aperture in the saddlebag to prevent water & debris from entering the saddlebag. The air vent insert further includes one or more air vents which extend through the air vent and facilitate the egress of sound waves generated by the transducer(s) to escape from the saddlebag & reflect from a ground plane. Each vent may be covered by directional waterproof acoustic membrane allowing sound waves & air to transfer from inside the saddlebag to the exterior environment, while preventing water & debris from entering the saddlebag via the vents.

Various example embodiments may be more completely understood in connection with the accompanying drawings.

Figure 1:
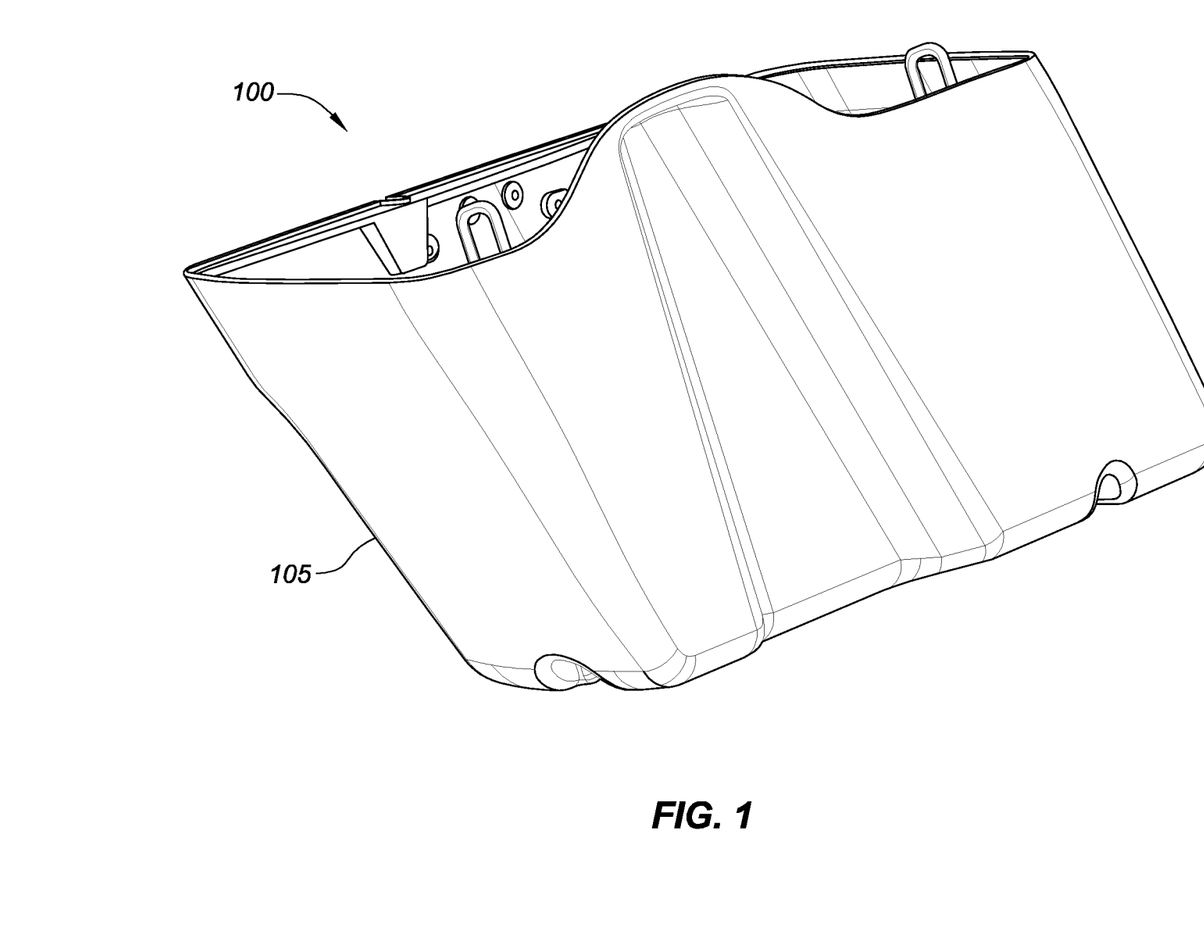
FIG. 1 is an isometric side view of a saddlebag with subwoofer assembly including the saddlebag, consistent with various aspects of the present disclosure.
Figure 2:
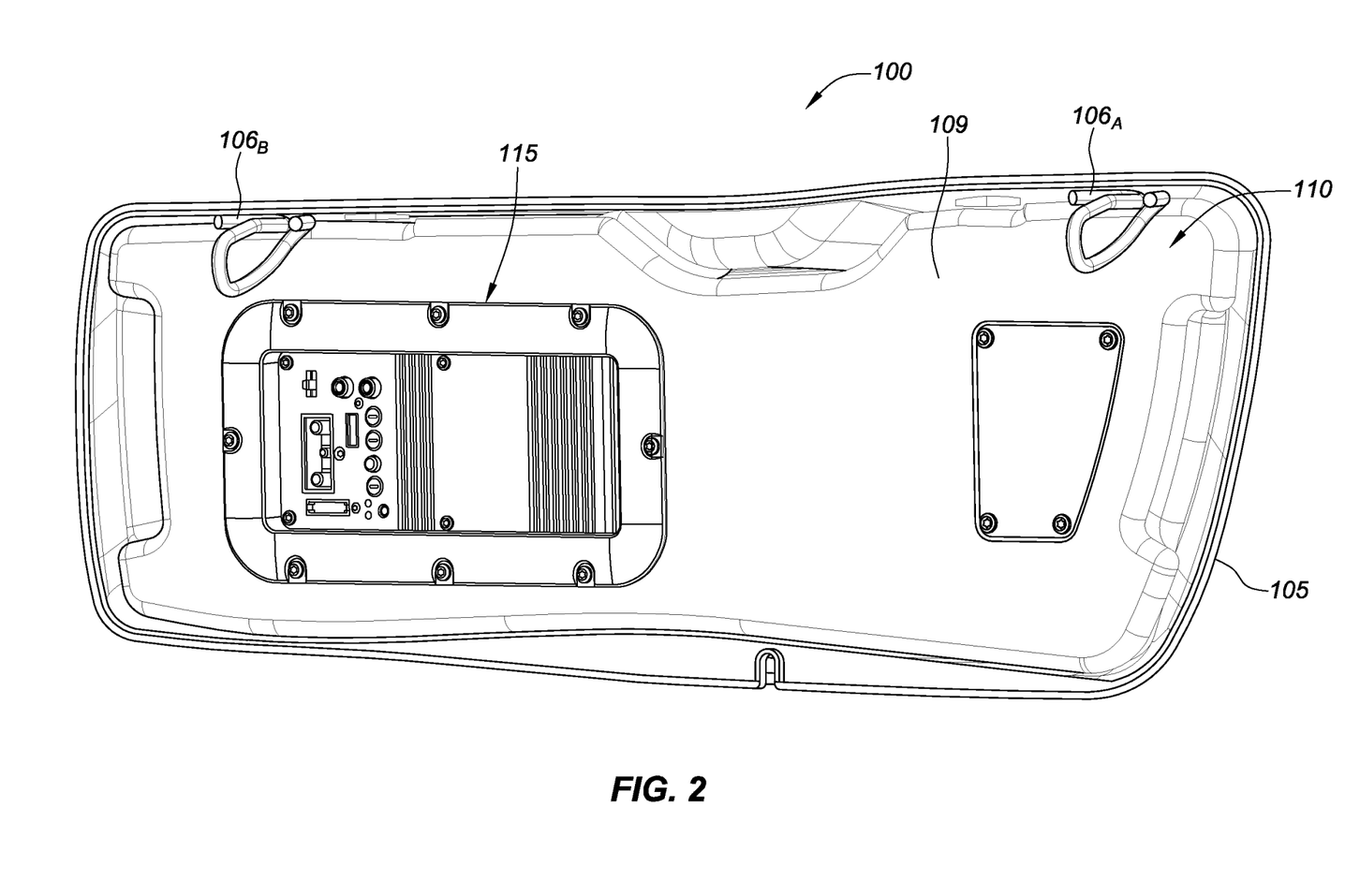
FIG. 2 is a top view of the saddlebag with subwoofer assembly of FIG. 1, consistent with various aspects of the present disclosure.
Figure 3:
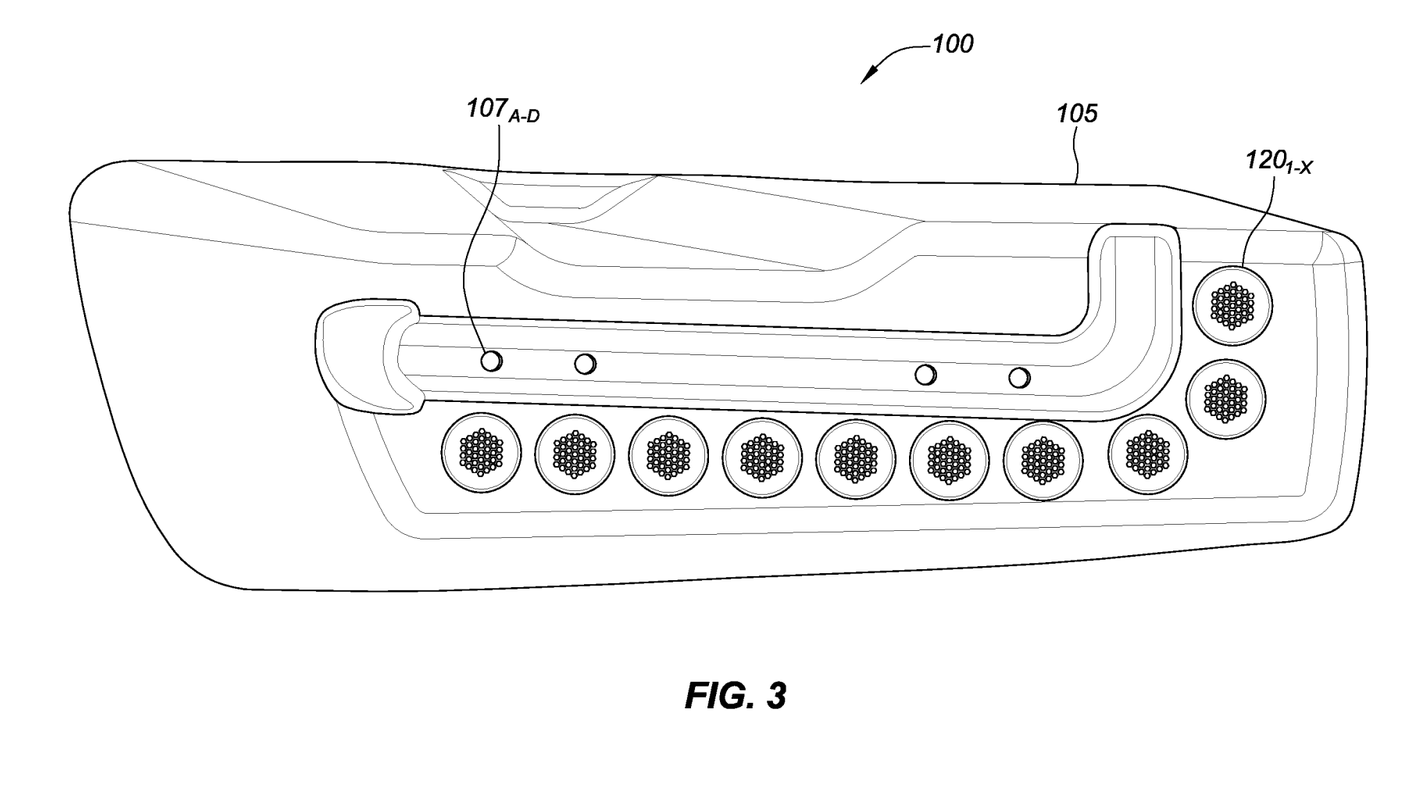
FIG. 3 is a bottom view of the saddlebag with subwoofer assembly of FIG. 1, consistent with various aspects of the present disclosure.

FIG. 1 is an isometric side view of a saddlebag 100 including a subwoofer assembly 110, FIG. 2 is a top view of the saddlebag subwoofer assembly of FIG. 1, and FIG. 3 is a bottom view of the saddlebag subwoofer assembly of FIG. 1, consistent with various aspects of the present disclosure. The subwoofer assembly 110 may be positioned within the saddlebag 105 (or storage container) of a motorcycle and a cover of the saddlebag (if applicable) secured to fully enclose the subwoofer assembly therein. The cover (not shown) may be secured to the saddlebag 105 via saddlebag cover latches 106A,B.

As discussed above, the subwoofer assembly 110 may be designed to universally fit within a number of saddlebags or be designed to fit within a specific saddlebag. In yet other embodiments, the subwoofer assembly may be integrated within an original equipment manufacturer or aftermarket saddlebag for direct bolt-on to a motorcycle.

FIG. 2 illustrates a subwoofer assembly 110 nested within a saddlebag 105. To facilitate plug-n-play integration with a motorcycle stereo system, subwoofer controller circuitry 115 is accessible on a top surface of subwoofer housing 109 including power and/or audio inputs. In yet other embodiments, the controller circuitry 115 may have wirelessly communication functionality (such as using Bluetooth communication protocol or other common wireless communication protocol). In such an embodiment, the subwoofer controller circuitry may wirelessly receive data packets from an audio head unit of the motorcycle indicative of low-frequency audio to be generated by the subwoofer transducer. The subwoofer assembly may further include an internal power source (i.e., a battery) that powers the controller circuitry, and an on-board amplifier that drives the subwoofer transducer. Such an embodiment allows for easy integration and installation of the subwoofer assembly into a motorcycle's audio system while facilitating quick removal of the subwoofer assembly where the saddlebag is required for storage.

In wired embodiments of the present disclosure, a motorcycle rider, depending on their storage and audio needs for a particular ride, may quickly un/install the subwoofer assembly 110 by simply disconnecting the power and/or audio inputs from the subwoofer controller circuitry 115 and lifting the subwoofer assembly out of the saddlebag.

To facilitate enhanced audio quality from subwoofer assembly 110, saddlebag 105 may include (or be modified to include) air vent inserts $120_{1-X}$ extending through a bottom of the saddlebag. Depending on the saddlebag 105 and motorcycle chassis that the saddlebag is mounted to, the positioning of these air vent inserts may vary to accommodate motorcycle mounting points $107_{A-D}$. Moreover, the size and shape of these air vents may also vary as necessary for particular applications. For example, where there are no (or limited) structures impeding the bottom of the saddlebag, a single large air vent may be utilized to transfer air in/out of the saddlebag in response to the actuation of the subwoofer transducer. In other embodiments, two large air vents may be positioned substantially aligned with and sized to the subwoofer transducer and passive radiator transducer of the subwoofer assembly 110. In yet another embodiment, and as illustrated in FIG. 3, structural impediments (such as a tubular frame of the motorcycle chassis for mounting the saddlebag via motorcycle mounting points $107_{A-D}$) may necessitate the use of a plurality of smaller air vent inserts $120_{1-X}$ positioned around the structural impediments. Each of the air vent inserts $120_{1-X}$ facilitate the exchange of air into/out of the saddlebag 105 in response to fluctuation of the subwoofer transducer and/or passive radiator transducer of the subwoofer assembly 110. Importantly, this exchange of air into/out of the saddlebag 105 facilitates the generation of greater audible levels from the saddlebag subwoofer assembly via boundary loading harmonics—lower frequency sound waves reflecting in an omni-directional pattern from a solid surface (i.e., the road surface) facing the downward facing subwoofer transducer generate greater audible levels for the motorcycle rider (and passenger).

While several embodiments of the present disclosure include a combination of a subwoofer transducer and a passive radiator transducer, in other embodiments one or more active subwoofer transducers may be utilized in the subwoofer assembly without a passive radiator transducer. In one preferred embodiment, the subwoofer assembly may include two active subwoofer transducers.

Figure 4:
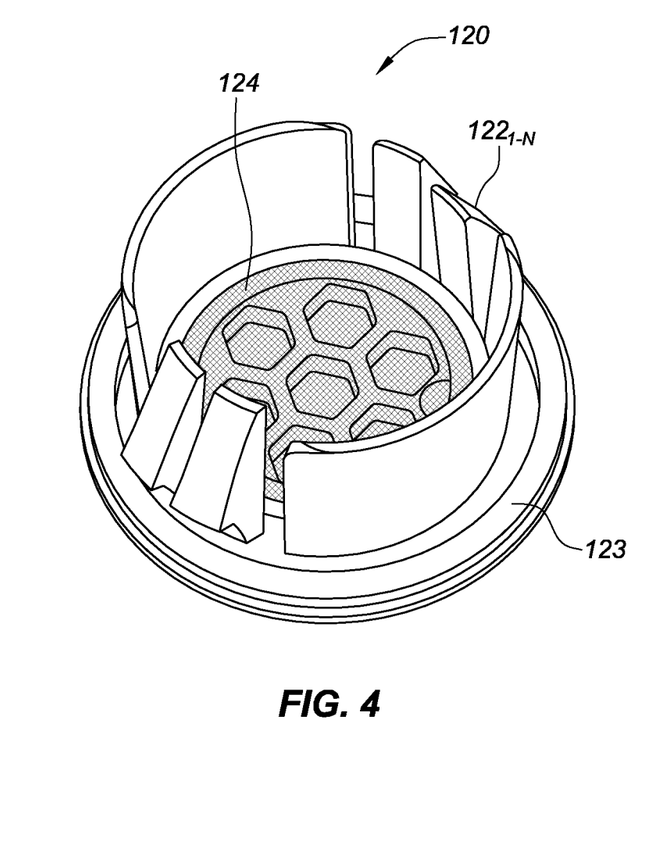
FIG. 4 is an isometric bottom view of an air vent insert, consistent with various aspects of the present disclosure.
Figure 5:
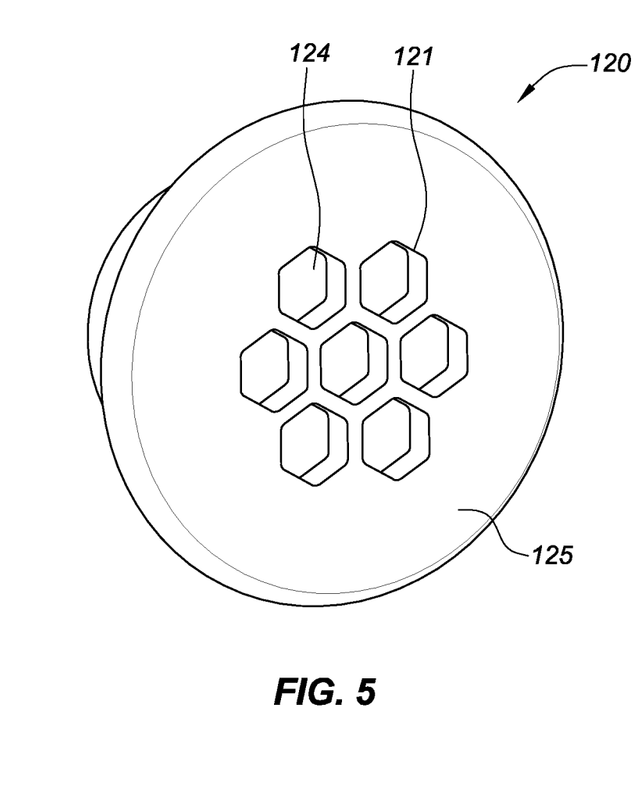
FIG. 5 is an isometric top view of the air vent insert of FIG. 4, consistent with various aspects of the present disclosure.

FIG. 4 is an isometric bottom view of an air vent insert 120, and FIG. 5 is an isometric top view of the air vent insert of FIG. 4, consistent with various aspects of the present disclosure. While the air vent insert illustrated in FIGS. 4 and 5 is circular, it is to be appreciated that a skilled artisan would be capable of modifying the shape and size of the air vent insert as necessary for a particular application. However, for some aftermarket install applications of a subwoofer assembly into a saddlebag, a circular air vent insert is preferred as the requisite circular aperture necessary for installation may be accomplished with a drill bit or hole saw.

In the present embodiment, a means for coupling the air vent insert 120 to a saddlebag is accomplished via snap-fit features. As shown in FIG. 4, one or more snap-fit beams $122_{1-N}$ may be positioned circumferentially around the air vent insert. When the air vent insert is inserted through an aperture of the saddlebag, the one or more snap-fit beams deform inward toward a longitudinal axis of the insert before extending past the aperture and re-bounding to their natural position coupling the air vent insert to the saddlebag. In one alternative embodiment, the air vent insert may be press fit onto the saddlebag. In another embodiment, an adhesive may be utilized to secure the air insert vent to the saddlebag. In yet a further embodiment, the vent insert may include a male threaded rod which when used in combination with a threaded nut couples the air vent insert to the saddlebag via the aperture.

At an interface between the air vent insert and a saddlebag, a gasket 123 may be utilized to prevent water ingress into the saddlebag.

The air vent insert 120 may include a plurality of air vents $121_{1-N}$ cut into an exterior facing surface 125 of the air vent insert. In FIG. 5, a grouping of 7 hexagonal shaped vents are illustrated with the grouping of vents also forming a generally hexagonal shape. In other embodiments, the insert may include one or more air vents, and each of the air vents may consist of the same or different shapes.

To prevent water ingress into the saddlebag via air vents $121_{1-N}$, a waterproof acoustic membrane may be placed over the air vents $121_{1-N}$. The waterproof acoustic membrane allows sound waves traveling through air within the saddlebag to exit with a downward trajectory, but prevents water and debris from entering the saddlebag via the vents.

Figure 6:
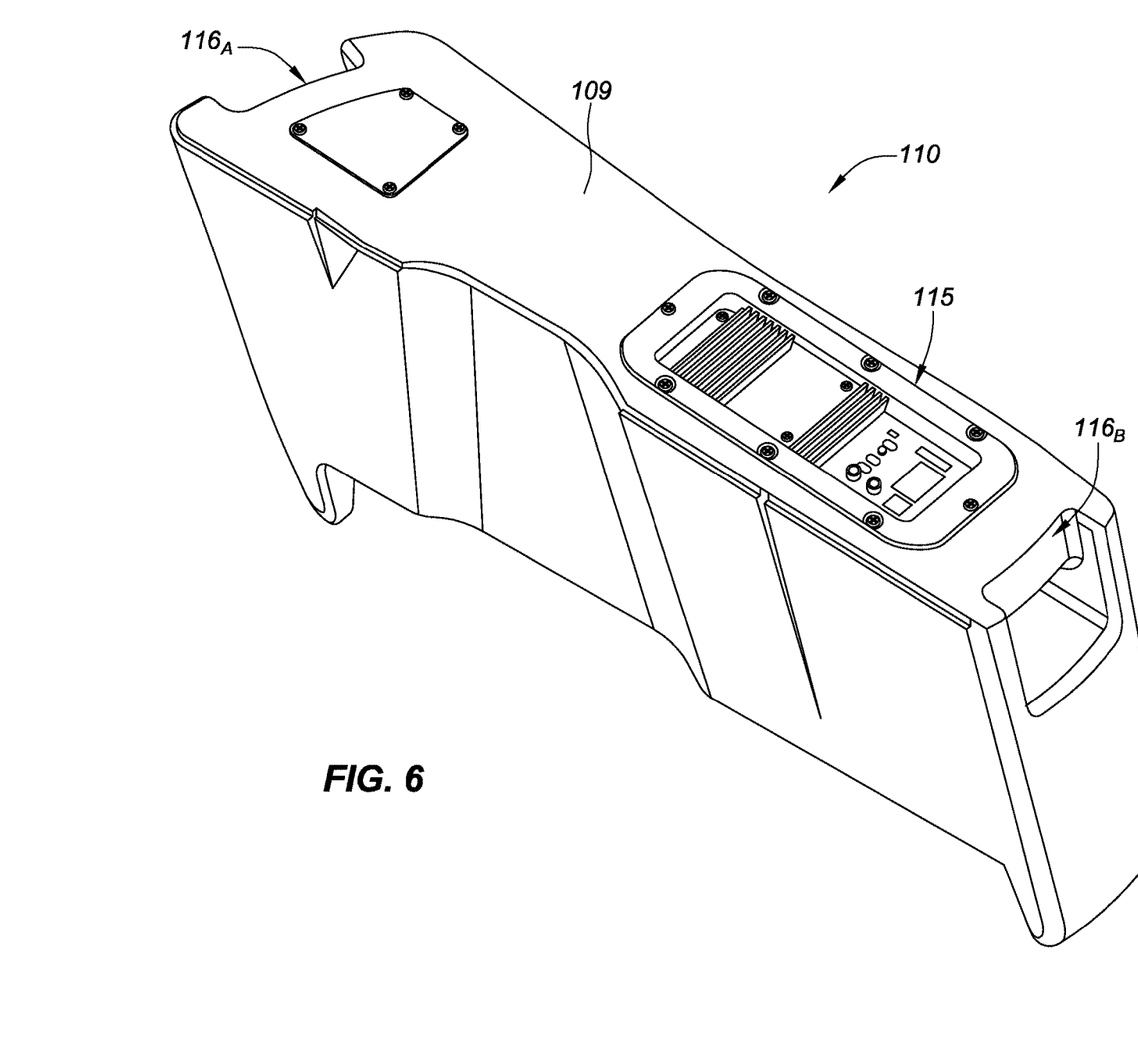
FIG. 6, is an isometric side view of a subwoofer assembly, consistent with various aspects of the present disclosure.
Figure 7:
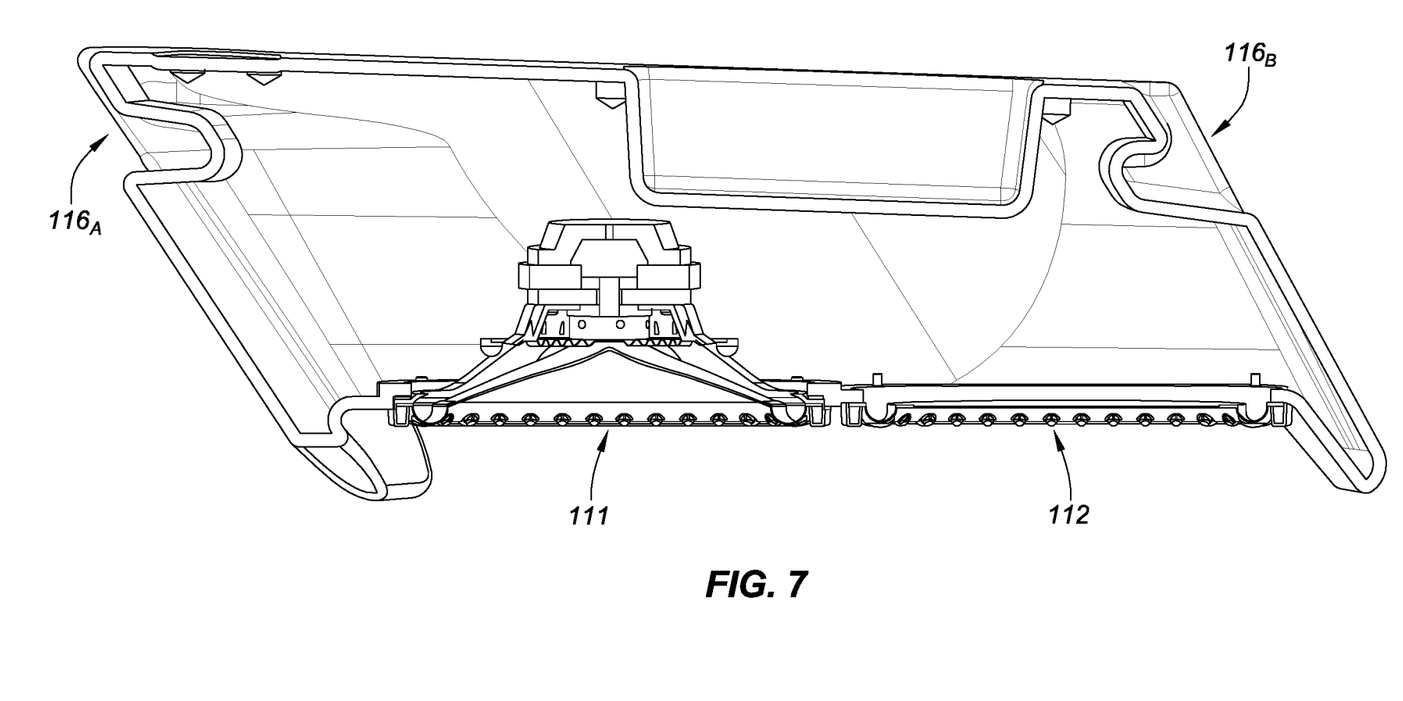
FIG. 7 is a cross-sectional side view of the subwoofer assembly of FIG. 6, consistent with various aspects of the present disclosure.
Figure 8:
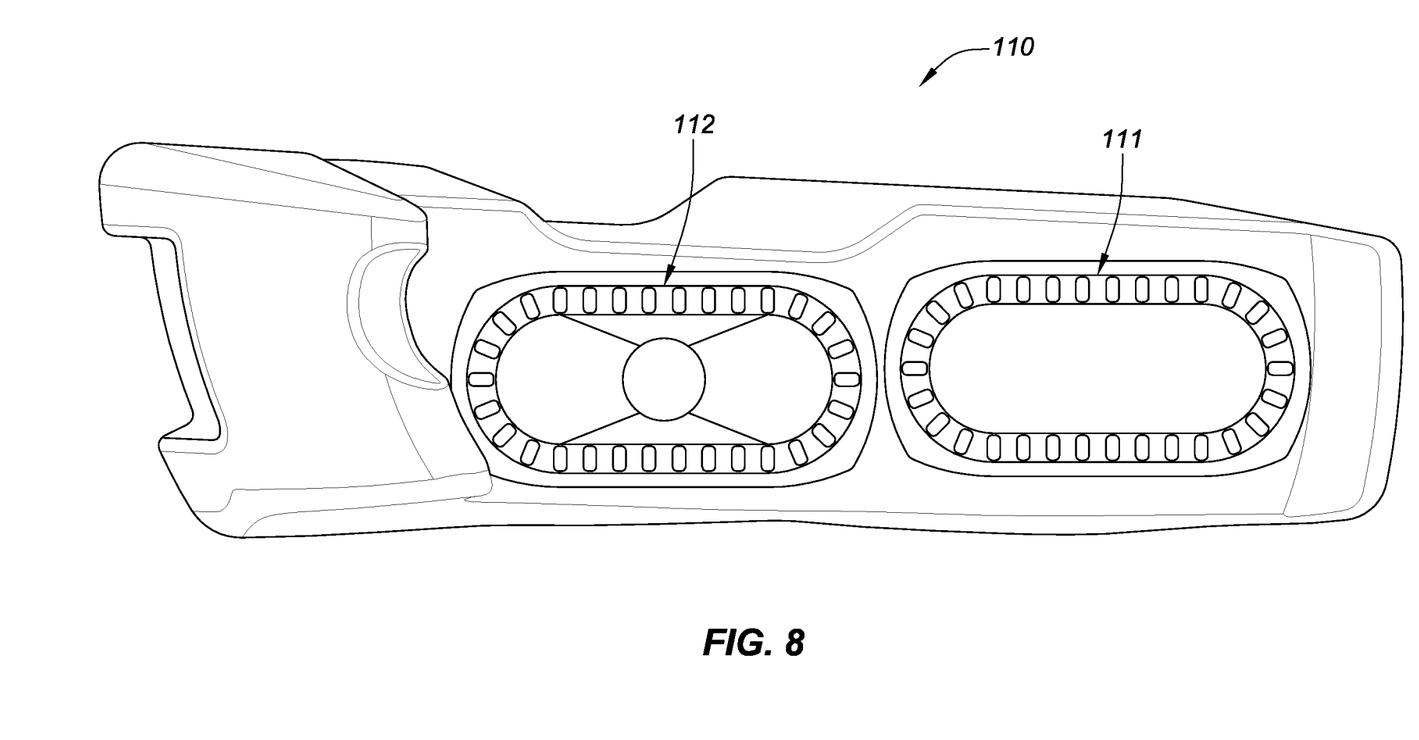
FIG. 8 is a bottom view of the subwoofer assembly of FIG. 6, consistent with various aspects of the present disclosure.

FIG. 6 is an isometric side view of a subwoofer assembly 110, FIG. 7 is a cross-sectional side view of the subwoofer assembly of FIG. 6, and FIG. 8 is a bottom view of the subwoofer assembly of FIG. 6, consistent with various aspects of the present disclosure. Subwoofer assembly 110, of the present embodiment, includes a subwoofer housing 109 that houses subwoofer controller circuitry 115, an active subwoofer transducer 111 and a passive radiator transducer 112. The subwoofer controller circuitry 115 may include an amplifier to drive the subwoofer transducer and power and/or audio inputs for communication with an audio head-unit of the motorcycle.

In some embodiments of the present disclosure, the subwoofer assembly 110 may not include the passive radiator transducer 112 and/or the subwoofer controller circuitry 115. In some motorcycle audio system set-ups, a head-unit of the motorcycle or an existing amplifier may be utilized to drive the subwoofer transducer 111 on-board the subwoofer assembly 110. Where the subwoofer controller circuitry 115 is not housed in the subwoofer assembly 110, the subwoofer assembly may include electrical connection points to couple the subwoofer transducer 111 to the external head-unit and/or amplifier.

As shown in FIGS. 6 and 7, subwoofer assembly 110 includes one or more grab handles $116_{A,B}$ to facilitate install of the subwoofer assembly into the saddlebag and removal thereof.

As shown in detail in FIGS. 7 and 8, and discussed above, active subwoofer transducer 111 and passive radiator transducer 112 are orientated downward. This downward orientation, in conjunction with air vents in a base of a saddlebag, takes advantage of boundary loading harmonics to generate greater audible levels from the road surface and further enhances the user's experience by introducing dynamic low frequency harmonics into the overall frequency response of the motorcycle's audio system.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A motorcycle saddlebag subwoofer system comprising:
   a motorcycle saddlebag including one or more air vent inserts extending through a base of the saddlebag; and
   a subwoofer assembly positioned within the saddlebag, the subwoofer assembly including a downward facing subwoofer transducer.

2. The motorcycle saddlebag subwoofer system of claim 1, wherein the subwoofer assembly further includes a passive radiator transducer that is downward facing.

3. The motorcycle saddlebag subwoofer system of claim 2, wherein the one or more air vent inserts include two air vents substantially axially aligned with and sized to the subwoofer transducer and passive radiator transducer, the two air vents configured and arranged to maximize the transfer of sound waves from within the motorcycle saddlebag to an external atmosphere.

4. The motorcycle saddlebag subwoofer system of claim 1, wherein the subwoofer assembly includes a second downward facing subwoofer transducer, wherein the downward facing subwoofer transducer includes a first diaphragm, and the second downward facing radiator subwoofer transducer includes a second diaphragm; wherein the first and second diaphragms are substantially the same dimensions.

5. The motorcycle saddlebag subwoofer system of claim 1, wherein the downward facing subwoofer transducer, in combination with the one or more air vent inserts, is configured and arranged to utilize boundary loading harmonics by emitting low frequency sound waves in a downward direction, through the air vent inserts, and which reflect in an omni-directional pattern from a road surface to generate greater audible levels of the low frequency sounds waves.

6. The motorcycle saddlebag subwoofer system of claim 1, wherein the one or more air vent inserts include
   one or more air vents which extend through a length of the air vent insert, the one or more air vents are configured and arranged to facilitate the transmission of sound waves out of the saddlebag, and
   a waterproof acoustic membrane material that extends across the one or more air vents and is configured and arranged to allow transmission of sound waves through the air vents and mitigate ingress of particulate and water into the saddlebag via the air vents.

7. The motorcycle saddlebag subwoofer system of claim 1, wherein the one or more air vent inserts in the base of the saddlebag include one or more air vents and a waterproof acoustic membrane configured and arranged to allow sound waves & air to transfer from inside the saddlebag to an exterior environment, while also preventing water & debris ingress into the saddlebag via the vents.

8. The motorcycle saddlebag subwoofer system of claim 1, wherein the subwoofer assembly further includes subwoofer controller circuitry and/or an amplifier.

9. The motorcycle saddlebag subwoofer system of claim 1, wherein the subwoofer assembly includes one or more handles configured and arranged to facilitate insertion into the motorcycle saddlebag and removal thereof.

* * * * *